(12) United States Patent
Berdou et al.

(10) Patent No.: US 10,519,776 B2
(45) Date of Patent: Dec. 31, 2019

(54) BLADE COMPRISING LANDS WITH A STIFFENER (71) Applicant: Safran Aircraft Engines, Paris (FR)

(72) Inventors: Caroline Jacqueline Denise Berdou, Moissy-cramayel (FR); Thomas Alain De Gaillard, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 35 days.

(21) Appl. No.: 15/569,665

(22) PCT Filed: Apr. 26, 2016

(86) PCT No.: PCT/FR2016/050979
§ 371 (c)(1),
(2) Date: Oct. 26, 2017

(87) PCT Pub. No.: WO2016/174343
PCT Pub. Date: Nov. 3, 2016

(65) Prior Publication Data
US 2018/0119550 A1    May 3, 2018

(30) Foreign Application Priority Data

Apr. 29, 2015  (FR) ...................... 15 53849

(51) Int. Cl.
F01D 5/14     (2006.01)
F01D 5/28     (2006.01)
(Continued)

(52) U.S. Cl.
CPC .............. *F01D 5/147* (2013.01); *B29B 11/06* (2013.01); *B29C 45/02* (2013.01);
(Continued)

(58) Field of Classification Search
CPC ... F01D 5/147; F01D 5/22; F01D 5/26; F01D 5/282; F01D 5/3007; B29B 11/06;
(Continued)

(56) References Cited

U.S. PATENT DOCUMENTS 8,142,163 B1*  3/2012 Davies .................... F01D 5/147
                                                           416/225
2013/0108467 A1*  5/2013 Berche .................... F01D 5/26
                                                           416/96 R (Continued)

FOREIGN PATENT DOCUMENTS

WO   WO 2013/079860 A1   6/2013
WO   WO 2013/104852 A2   7/2013
WO   WO 2014/076408 A1   5/2014

OTHER PUBLICATIONS

International Search Report and English translation dated Aug. 17, 2016, in International Application No. PCT/FR2016/050979 (6 pages).

*Primary Examiner* — Erick R Solis
*Assistant Examiner* — Robert A Werner
(74) *Attorney, Agent, or Firm* — Bookoff McAndrews, PLLC (57) ABSTRACT A preform for a turbine engine blade, the preform comprising a main fiber preform obtained by three-dimensional weaving and comprising a first longitudinal segment suitable for forming a blade root (21), a second longitudinal segment extending the first longitudinal segment upwards, and suitable for forming an airfoil portion (22), and a first transverse segment extending transversely from the junction between the first and second longitudinal segments, and suitable for forming a first platform (23), wherein the preform also includes at least one stiffener (40) fitted on the main fiber preform along at least a portion of the distal edge of the first transverse segment.

15 Claims, 6 Drawing Sheets (51) Int. Cl.
*B29B 11/06* (2006.01)
*B29C 45/02* (2006.01)
*B29C 45/14* (2006.01)
B29K 63/00 (2006.01)
B29K 105/20 (2006.01)
B29L 31/08 (2006.01)

(52) U.S. Cl.
CPC .......... *B29C 45/1418* (2013.01); *F01D 5/282* (2013.01); *B29C 2045/14245* (2013.01); *B29K 2063/00* (2013.01); *B29K 2105/20* (2013.01); *B29L 2031/082* (2013.01); *F05D 2220/36* (2013.01); *F05D 2240/30* (2013.01); *F05D 2240/80* (2013.01); *F05D 2300/603* (2013.01)

(58) Field of Classification Search
CPC ..... B29B 11/16; B29C 45/02; B29C 45/1418; B29C 2045/14245; B29L 2031/08; B29L 2031/082; B29K 2105/20; B29K 2105/2063; B29K 2105/00; F05D 2220/36; F05D 2240/30; F05D 2240/80; F05D 2300/603; Y02T 50/672; Y02T 50/673

USPC .............................. 416/179, 189, 193, 193 A
See application file for complete search history.

(56) References Cited

U.S. PATENT DOCUMENTS

| | | | |
|---|---|---|---|
| 2013/0121810 A1* | 5/2013 | Alquier | F01D 11/006 415/116 |
| 2013/0330196 A1* | 12/2013 | Brown | F01D 5/147 416/219 R |
| 2015/0016960 A1* | 1/2015 | Ravier | F04D 29/16 415/111 |
| 2015/0104315 A1* | 4/2015 | Tatton | F01D 5/3007 416/174 |
| 2016/0222800 A1* | 8/2016 | Kleinow | F01D 5/22 |
| 2017/0058912 A1* | 3/2017 | De Gaillard | B29B 11/16 |
| 2017/0326757 A1* | 11/2017 | Marin | F01D 5/284 |
| 2018/0119549 A1* | 5/2018 | Vetters | F01D 5/147 |
| 2018/0171805 A1* | 6/2018 | Freeman | F01D 5/282 |
| 2018/0187562 A1* | 7/2018 | Thistle | F01D 5/22 |

* cited by examiner

BLADE COMPRISING LANDS WITH A STIFFENER

CROSS-REFERENCE TO RELATED APPLICATIONS

This application is the U.S. national phase entry under 35 U.S.C. § 371 of International Application No. PCT/FR2016/050979, filed on Apr. 26, 2016, which claims priority to French Patent Application No. 1553849, filed on Apr. 29, 2015, the entireties of which are herein incorporated by reference.

FIELD OF THE INVENTION

The present invention relates to a preform for a turbine engine blade and also to a single-piece blade that can be formed from such a preform, to a bladed wheel, and to a turbine engine including such a blade.

Such a preform may be used to make blades having aerodynamic platforms provided with respective stiffeners. Such blades may in particular be fan blades of an airplane turbojet, to mention just one example.

STATE OF THE PRIOR ART

In order to reduce the weight of airplane turbojets, and thus reduce the consumption of such turbojets, it is now known to fabricate some of the blades of the jet out of composite material, which is much lighter than the metal that was conventionally used in the past.

For this purpose, it is also known nowadays to use three-dimensional weaving techniques in order to obtain fiber preforms that give rise to composite blades of very good quality. Document WO 2014/076408 describes in particular a method of weaving a fiber preform that makes it possible to obtain in single-piece manner blades that are provided with pressure side and suction side platforms, those platforms being of constant thickness.

Nevertheless, those platforms need to satisfy a large number of requirements and to perform numerous functions. Mainly, such platforms need to perform an aerodynamic function of defining and channeling the air streams flowing through the turbojet. Nevertheless, they also need to provide mechanical strength that is guaranteed for all stages of flight and they must also provide coherent integration in the environment of the engine, in particular avoiding introducing downstream disturbances in the air stream. Thus, the shape of platforms needs to be finely controlled, throughout the operation of the engine, and regardless of the stage of flight.

Unfortunately, in particular during tests and simulations carried out on such blades, the inventors have found that various zones of those platforms derived from 3D weaving become deformed to a greater or lesser extent under the effect of centrifugal forces that act while the turbine engine is in operation. In particular, the inventors have observed that the deformation of a zone of a platform increases with increasing distance of that zone from the airfoil.

Under such circumstances, those platforms present shape irregularities in operation that can disturb the air stream and thus the efficiency of the turbine engine. In addition, the inventors have observed that, amongst other things, the bending depends on cantilever length. Thus, since the cantilever length differs between the pressure side and suction side platforms of two consecutive blades, there is a discontinuity of bending at that interface, leading to a risk of the platforms overlapping.

There thus exists a real need for a preform, a blade, a bladed wheel, and a turbine engine that avoid the drawbacks inherent to the above-mentioned known systems, at least to some extent.

SUMMARY OF THE INVENTION

The present description provides a preform for a turbine engine blade, the preform comprising a main fiber preform obtained by three-dimensional weaving and comprising a first longitudinal segment suitable for forming a blade root, a second longitudinal segment extending the first longitudinal segment upwards, and suitable for forming an airfoil portion, and a first transverse segment extending transversely from the junction between the first and second longitudinal segments, and suitable for forming a first platform, wherein the preform also includes at least a stiffener fitted on the main fiber preform along at least a portion of the distal edge of the first transverse segment.

By means of such a preform, it is possible to obtain in single-piece manner a blade that comprises a blade root, an airfoil portion, and at least a platform provided with a stiffener ensuring that the platform deforms in more regular manner under the effect of centrifugal force while the turbine engine is in operation.

Specifically, the presence of the stiffener serves to secure the various zones of the platform better, and most particularly the distal zones of the platform, thereby tending towards radial deformation that is more uniform at the ends of the platform. This, so to speak, averages out the deformation of the platform, with the zones that are usually strongly deflected pulling outwards the zones that are usually less deflected, while those zones hold inwards the zones that are subjected to larger movements. Under such circumstances, the platform conserves a relatively regular profile in operation, thus disturbing the flow of the air stream little or not at all.

Because of this preform, it is thus possible to benefit from the advantages of a 3D woven single-piece blade (weight saving; small number of parts; simplified assembly and maintenance; etc.) while ensuring aerodynamic regularity for the air stream.

Furthermore, fitting such a stiffener to the main fiber preform, instead of extending the platform with a woven band, for example, makes it possible to conserve the existing weaving strategy for the main fiber preform, thereby simplifying weaving, and provides great freedom in selecting the shape for the preform while not weakening its structure.

In the present description, the terms "longitudinal", "transverse", "bottom", "top", and their derivatives are defined relative to the main direction of the blade in question, the blade root being situated at the bottom end of the blade in this frame of reference; the terms "proximal", "distal", and their derivatives are defined relative to the airfoil of the blade; the terms "axial", "radial", "tangential", and their derivatives are defined relative to the main axis of the wheel having these blades, i.e. in general, the axis of the turbine engine. The term "axial plane" designates a plane containing the main axis of the turbine engine and the term "radial plane" designates a plane perpendicular to the main axis; the term "longitudinal plane" designates a plane parallel to the main direction of the blade and perpendicular to the direction in which the blade root extends: such a longitudinal plane is thus a radial plane in the reference frame of the turbine engine. In addition, the terms "upstream" and "downstream" are defined relative to the flow of air through the turbine engine.

Finally, the term "three-dimensional weaving" is used to designate a weaving technique in which weft yarns move within an array of warp yarns in such a manner as to form a three-dimensional mesh of yarns in a three-dimensional weave: all of the layers of yarns in such a fiber structure are thus woven during a single weaving step within a three-dimensional loom.

In certain embodiments, the stiffener is made of metal material. Such metal material thus provides considerable stiffness.

In certain embodiments, the stiffener is made of composite material. Although generally less stiff than metal, such a composite material is lighter in weight. The material of the stiffener can thus be selected as a function of the particular needs and constraints of a given part.

In certain embodiments, the stiffener extends over at least one-third of the length of the distal edge of the first transverse segment. By way of example, it may be provided only in those zones of the platform that are normally subjected to the greatest amounts of deformation, i.e. those that are the furthest away from the airfoil.

In certain embodiments, the stiffener extends along the distal end of the first transverse segment at least from its upstream or downstream end. Specifically, for a suction side platform, it is upstream and downstream ends of the platform that are usually subjected to large amounts of deformation.

In certain embodiments, the stiffener extends all along the distal edge of the first transverse segment. This balances out deformation and stiffens the platform along its entire length.

In certain embodiments, the stiffener is a shim possessing a U-shaped section and gripping the distal edge of the first transverse segment. Such a shim is easy to fabricate and put into place.

In certain embodiments, the top flange and the bottom flange of the U-shaped shim possess the same length. Nevertheless, in other embodiments, the bottom flange may be of a length that is different in order to limit the occurrence of zones of weakness. In particular, the bottom flange may be longer than the top flange in order to distribute forces better over the shim.

In certain embodiments, the top end of the shim engages in a setback formed in the top surface of the first transverse segment so that the top surface of the shim is flush with the top surface of the first transverse segment. This makes it possible to obtain an air flow passage surface that is smooth at the interface between the platform and the shim. Such a setback may be obtained during weaving by causing yarns to exit, or else subsequently, in particular after consolidation, by machining.

In certain embodiments, the bottom end of the shim is engaged in a setback formed in the bottom surface of the first transverse segment such that the bottom surface of the shim is flush with the bottom surface of the first transverse segment. The same forming options are available as for this bottom setback.

In certain embodiments, the stiffener is a box shape fitted against the bottom surface of the first transverse segment. Because of this box shape, such a stiffener has considerable stiffness. In addition, since the box shape is fitted under the platform, design options for the box are relatively free: in particular, it may possess considerable width, so as to stiffen the platform over a greater area, or considerable thickness, so as to benefit from greater stiffness.

In certain embodiments, the box shape is polygonal in section. It is preferably hollow, thus possessing an internal cavity. Nevertheless, the box shape may be of varying section: this makes it possible to adjust the stiffness of the stiffener along the platform.

In certain embodiments, the stiffener possesses an axial spline or an axial notch configured to co-operate respectively with the axial notch or the axial spline of a stiffener of a platform of a neighboring blade. This improves sealing of the air flow passage at the interface between two platforms. Furthermore, such a device makes it possible to reduce the risk of a platform overlapping onto a neighboring platform, e.g. in the event of ingesting a bird.

In certain embodiments, the stiffener is a cylinder, with the distal end of the first transverse segment being wound around the cylinder. Under such circumstances, it may be necessary to provide an extra length of woven material at the distal end of the transverse segment of the main fiber preform. A high degree of cohesion is thus ensured between the main fiber preform and the stiffener.

In certain embodiments, the cylinder is provided with spikes that are configured to penetrate into the fiber surface of the first transverse segment. Like a curler for hair, this serves to improve attachment between the cylinder and the main preform.

In certain embodiments, the stiffener possesses an axial internal cavity. Such a cavity reduces the weight of the stiffener. It may also be used to attach a fastener or retaining device for the platform, such as a hook or a retaining tab, with which the rotor is provided.

In certain embodiments, the section of the stiffener varies. In this way, it is possible to take account of the shape of the platform in order to compensate for its deformation in a manner that is better optimized. In particular, a varying width makes it possible to adjust both the stiffness of the stiffener, and thus the transmission of forces from one zone to another of the platform, and also the weight added locally to the platform, and thus adjust locally the centrifugal forces acting on the platform. In particular, by adding weight locally in a zone of the platform that is usually less deflected, the magnitude of centrifugal force in this zone is increased such that it is deflected a little more and becomes aligned more easily with neighboring zones that are naturally deflected to a greater extent.

In certain embodiments, the main fiber preform has a second transverse segment extending transversely from the junction between the first and second longitudinal segments, level with and going away from the first transverse segment, and suitable for forming a second platform, and wherein the preform also has a second stiffener fitted on the main fiber preform along at least a portion of the distal edge of the second transverse segment.

It will naturally be understood that all of the characteristics mentioned above concerning the first transverse segment can be transposed to the second transverse segment. In particular, the stiffener of the second transverse segment may be identical in nature or different from the stiffener of the first transverse segment.

In certain embodiments, the yarns used for weaving the preform are carbon fibers. Nevertheless, they could be any other type of yarn, for example glass fibers or Kevlar fibers.

In certain embodiments, the weave used for the three-dimensional weaving of the preform is of the 3D interlock type. Nevertheless, the outside surfaces of the preform may be essentially made by two-dimensional weaving, e.g. of the satin type.

The present description also provides a blade for a turbine engine, comprising a blade root, an airfoil portion extending upwards from the blade root, and a platform, made of composite material and extending transversely to the airfoil portion level with the junction between the blade root and the airfoil portion, wherein the platform has a stiffener extending along at least a portion of the distal edge of said platform.

It can be understood that this blade corresponds to the blade that can be obtained using the above preform. Nevertheless, such a blade could also be obtained from the above-described main fiber preform, with the stiffener being fitted to the platform after the main fiber preform has been consolidated. Either way, all of the characteristics and advantages described above can be transposed directly to this blade, whatever the technique used for obtaining it.

In certain embodiments, the blade is made in single-piece manner out of composite material by means of a preform in accordance with any of the preceding embodiments, said preform being shaped in a mold and embedded in a matrix.

In certain embodiments, the matrix is of organic type. In particular it may be an epoxy resin.

In other embodiments, the matrix is of the ceramic type.

In certain embodiments, the stiffener is fitted to the platform.

The present description also relates to a bladed wheel for a turbine engine, and having a plurality of blades in accordance with any of the preceding embodiments.

It may be a rotor wheel, such as a fan, in which the blades are arranged angularly around a rotary hub, or it may be stator wheel, in which the blades are vanes arranged angularly within a stationary shell.

The present description also provides a turbine engine, including at least a blade or at least a bladed wheel in accordance with any preceding embodiment.

The above-mentioned characteristics and advantages, and others, appear on reading the following detailed description of embodiments of the preform, of the blade, of the bladed wheel, and of the turbine engine that are proposed. The detailed description is made with reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are referenced using the same reference signs. Furthermore, elements (or portions of an element) belonging to different embodiments but having analogous functions are identified in the figures by numerical references increased by 100, 200, etc.

DETAILED DESCRIPTION OF EMBODIMENTS

In order to make the invention more concrete, embodiments are described in detail below with reference to the accompanying drawings. It should be understood that the invention is not limited to these embodiments.

Figure 1:
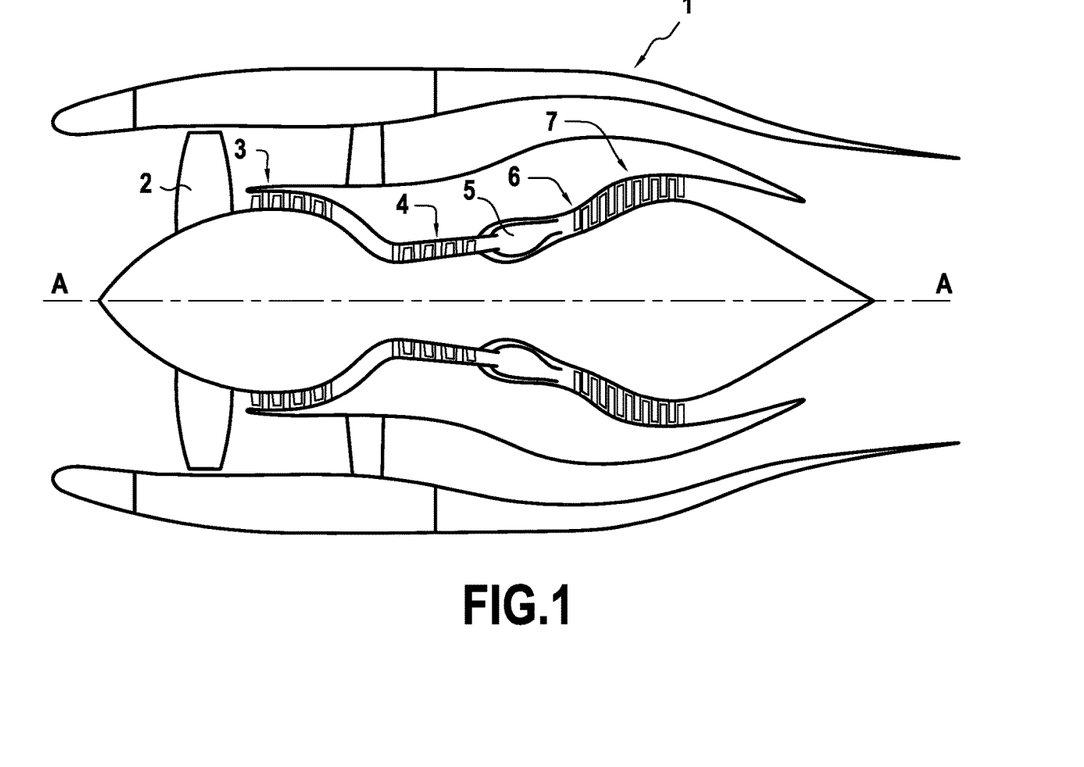
FIG. 1 is an axial section view of a turbine engine of the invention.

FIG. 1 is a section view of a bypass turbojet 1 of the invention, the section being on a vertical plane containing the main axis A of the jet. Going from upstream to downstream in the flow direction of the air stream, it comprises a fan 2, a low pressure compressor 3, a high pressure compressor 4, a combustion chamber 5, a high pressure turbine 6, and a low pressure turbine 7.

Figure 2:
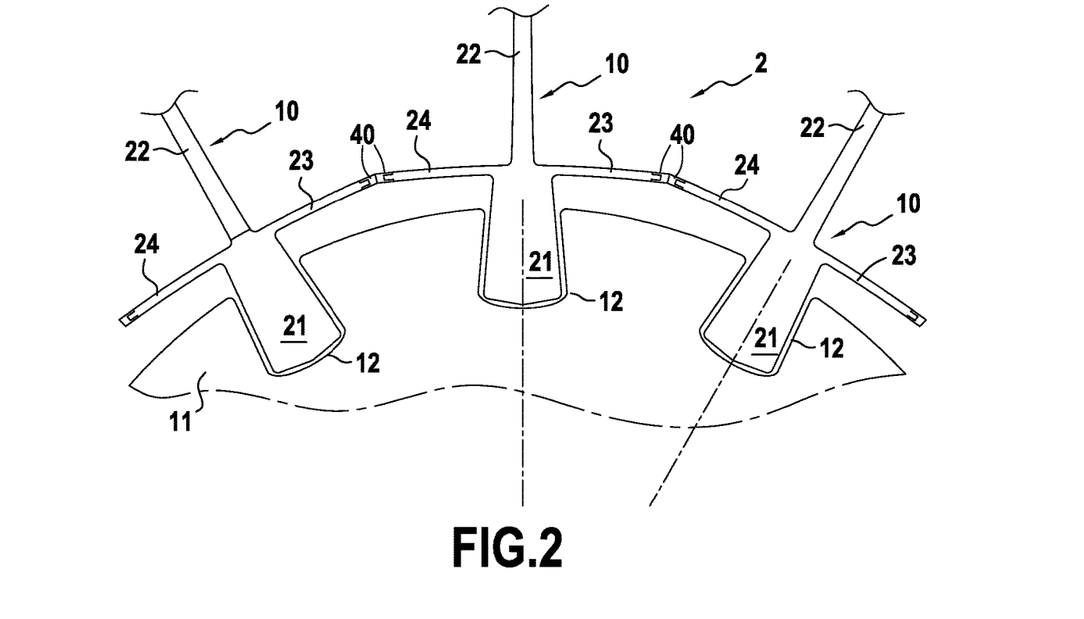
FIG. 2 is a fragmentary radial section diagram of a bladed wheel of the invention.

As shown in FIG. 2, the fan 2 has a plurality of fan blades 10 mounted angularly around the axis A on a disk 11 that is connected to the low pressure shaft of the turbine engine 1.

Figure 3:
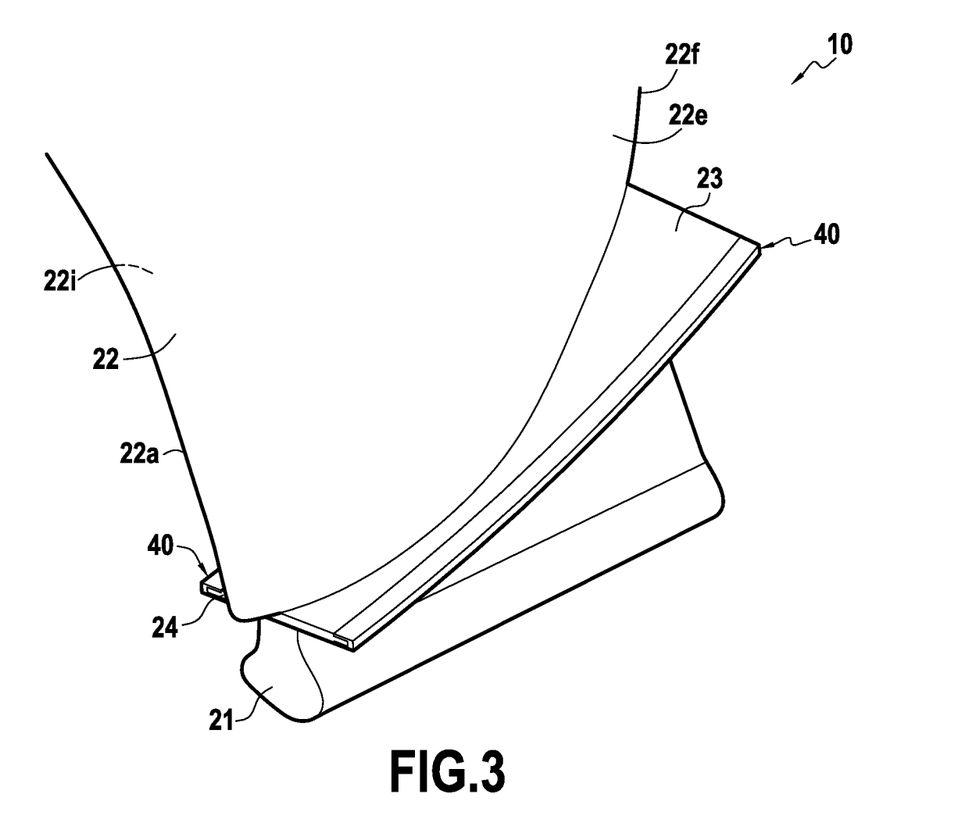
FIG. 3 is a fragmentary perspective view of a blade constituting an embodiment.

Such a fan blade is shown in FIG. 3. It comprises a blade root 21 of dovetail-shape configured to engage in a slot 12 of the disk 11 so as to secure it to the disk 11. This blade root 21 is extended upwards by an airfoil 22 presenting a suction side face 22e and a pressure side face 22i, each extending from upstream to downstream between a leading edge 22a and a trailing edge 22f.

The blade 10 also has a suction side platform 23, extending transversely on the suction side of the blade from the junction between the blade root 21 and the airfoil 22, and a pressure side platform 24 extending transversely on the pressure side of the blade from the junction between the blade root 21 and the airfoil 22.

Figure 4:
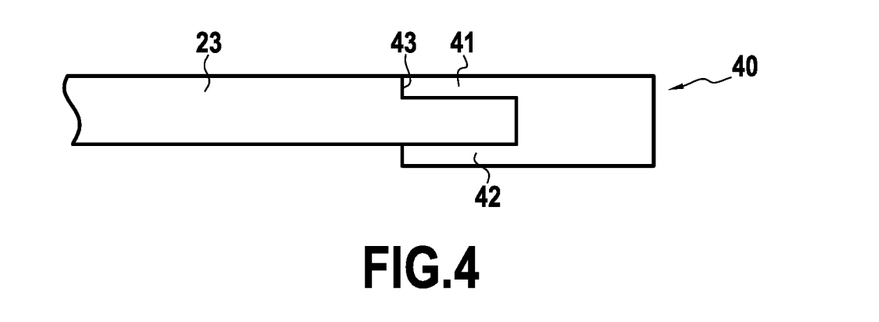
FIG. 4 is a section view of the stiffener in a first embodiment.

The distal end of each platform 23, 24 is provided with a shim 40 forming a stiffener. The shim 40, which can be seen more clearly in FIG. 4, is a section member presenting a U-shaped cross-section: it has a top flange 41 and a bottom flange 42 gripping the distal end of the platform 23.

The top surface of the distal end of the platform 23 presents a setback 43 of depth corresponding to the thickness of the top flange 41 of the shim 40. Thus, when the shim 40 is fitted on the distal end of the platform 23, its top flange 41 engages in the setback 43 so that the shim 40 is flush with the top surface of the platform 23.

In this embodiment, the blade 10 is obtained as a single piece by 3D weaving a main fiber preform 30, by putting shims 40 on the main fiber preform 30, and by injecting an organic resin using the resin transfer molding (RTM) method known to the person skilled in the art.

Figure 5:
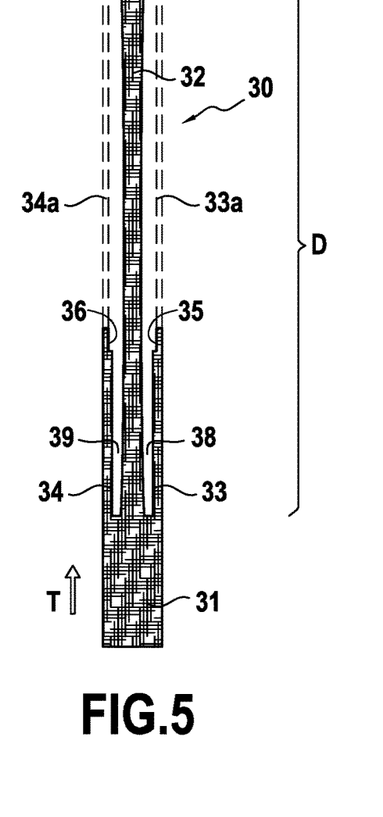
FIG. 5 is a diagrammatic view of the preform corresponding to this embodiment of the blade prior to being shaped.
Figure 6:
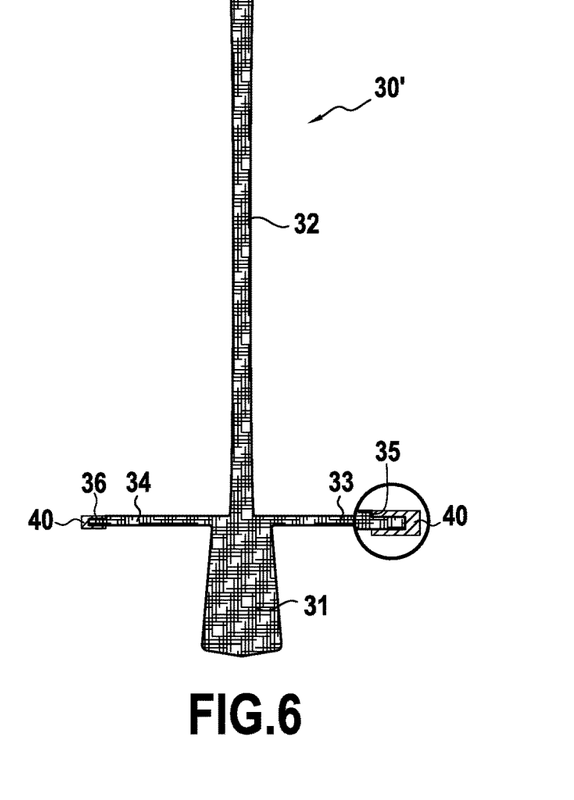
FIG. 6 is a diagram showing the preform corresponding to the blade after it has been shaped.

FIG. 5 shows the three-dimensionally woven preform 30 used for making this embodiment of the blade 10. FIG. 6 shows the final preform 30' after shaping and putting the shims 40 into place. The preform 30 is described going upwards, i.e. from upstream to downstream in the weaving direction T. Nevertheless, it should be understood that the weaving could be carried out starting from the other end and in the opposite direction.

In this embodiment, the preform 30 is three-dimensionally woven out of carbon fibers using a 3D interlock weave.

Only the surfaces of the preform 30 are woven two-dimensionally with a satin type weave.

At the bottom end, the weaving begins by making a first longitudinal segment 31 that is to form the root 21 of the blade 10.

Above this first longitudinal segment 31, there begins a zone D of non-interlocking in which a first free strip 33a, a second longitudinal segment 32, and a second free strip 34b are woven jointly in non-interlinked manner with respective planes 38 and 39 of non-interlinking. Methods of weaving that enable such non-interlinking are nowadays well known in the field of 3D weaving.

Layer exits may also be made along the weaving direction T between the second longitudinal segment 32 and each of the free strips 33a, 34a in order to thin down the second longitudinal segment 32 and thus the future airfoil 22. Weaving methods enabling such layers to exit are nowadays well known in the field of 3D weaving.

Layer exits 35 and 36 are also arranged from a certain level along the free strips 33a and 34a.

Once the weaving has finished, the free strips 33a and 34a are cut to length so as to form respectively a first transverse segment 33 that is to form the suction side platform 23 of the blade 10, and a second transverse segment 34 that is to form the pressure side platform 24 of the blade 10.

It should be observed at this point that the qualifications "transverse" and "longitudinal" are given as a function of the final position of the segment in question, the transverse segments necessarily being woven longitudinally prior to being folded transversely.

Once the free strips 33a and 34a have been cut to length, the floated yarns that result from the layer exits made at the surfaces of the second longitudinal segment 32 and of the free strips 33a, 34b become accessible and can be sheared. The layer exits 35 and 36 thus form setbacks leading to the setback 43 at the distal ends of the platforms 23 and 24.

Thereafter, the preform 30 can be moistened to soften it and make it easier to move the fibers out of register. The main preform 30 is then put into a forming mold of inside space that matches the shape required for the preform 30.

The preform 30 is then dried so that it stiffens, thereby blocking the shape imparted during shaping. As shown in FIG. 6, the shims 40 are then fitted to the ends of the transverse segments of the main preform 30, with their top flanges engaging in the setbacks 35 and 36 of the main preform. The preform 30' as finished off in this way is finally placed in an injection mold having the dimensions of the desired final blade 10, and into which a matrix is injected, in this example an epoxy resin. Such injection may for example be performed by the known RTM method. This co-injection then serves to secure the shims 40 on the main preform 30 in such a manner that, at the end of this step, the blade 10 is obtained as a single piece made of composite material fitted with shims 40.

Naturally, the above-described weaving example is only one example among many other possible examples that the person skilled in the art recognizes easily. In particular, it is possible to imagine other arrangements of non-interlinking and to use other weaving techniques such as crossing layers, extracting layers, or transitions of thickness, in order to obtain an analogous preform shape. The person skilled in the art will find numerous weaving examples in Document WO 2014/076408, in particular.

Furthermore, in another example, the main preform 30 may initially be consolidated on its own by injecting the matrix, after which the shims 40 may be fitted in a second step by adhesive, riveting, bolting, or any other fastening method. Under such circumstances, the setback 43 may be obtained by machining the platform 23 after consolidation rather than by causing layers to exit during weaving.

Figure 7:
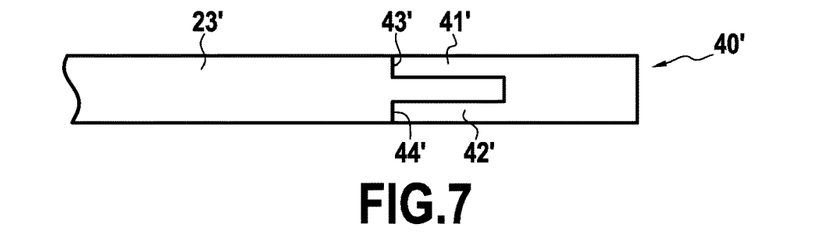
FIG. 7 is a section view of the stiffener in a variant of the first embodiment.

In a first variant embodiment, as shown in FIG. 7, the bottom surface of the distal end of the platform 23' may likewise present a setback 44' of depth corresponding to the thickness of the bottom flange 42' of the shim 40'.

Figure 8:
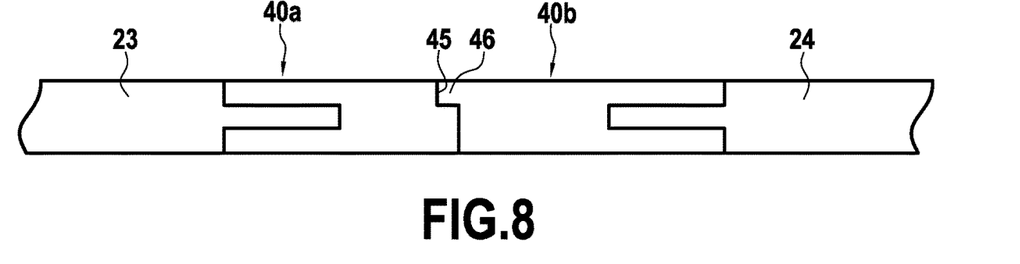
FIG. 8 is a section view of the stiffener in another variant of the first embodiment.

In a second variant embodiment, as shown in FIG. 8, the shims 40a of the suction side platforms 23 possesses respective grooves 45 at their distal ends, while the shims 40b of the pressure side platforms 24 present respective splines 46 capable of co-operating with the groove 45 in the neighboring shim 40a. Naturally, the inverse configuration is also possible.

Figure 9:
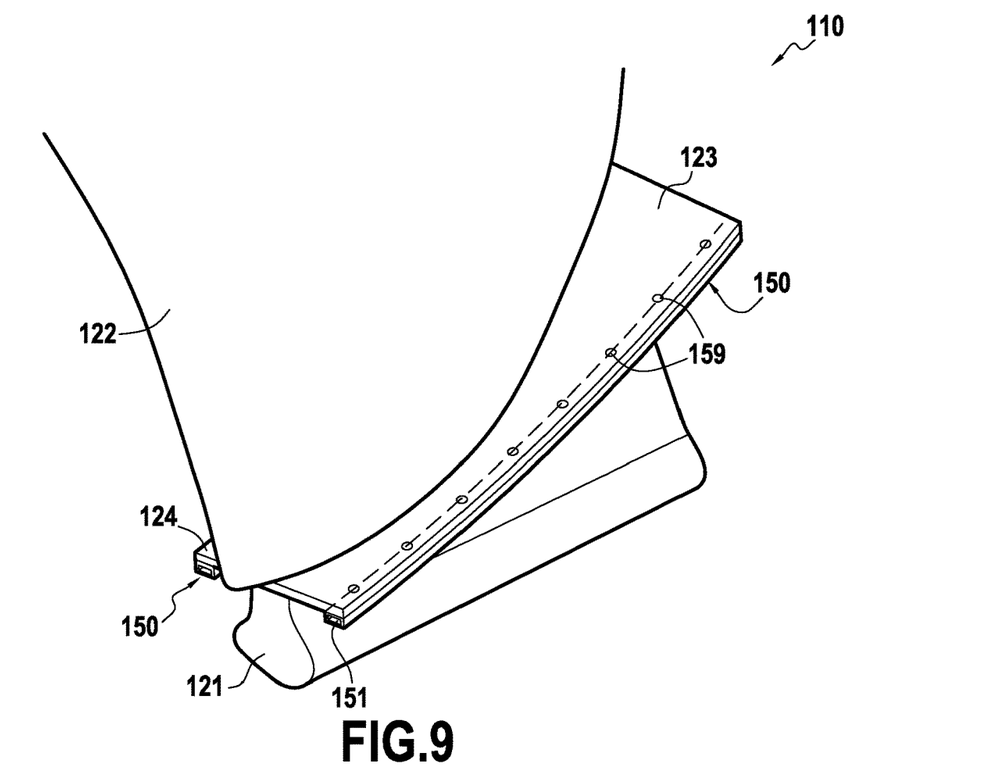
FIGS. 9 and 10 are fragmentary perspective views of a blade in a second embodiment.
Figure 10:
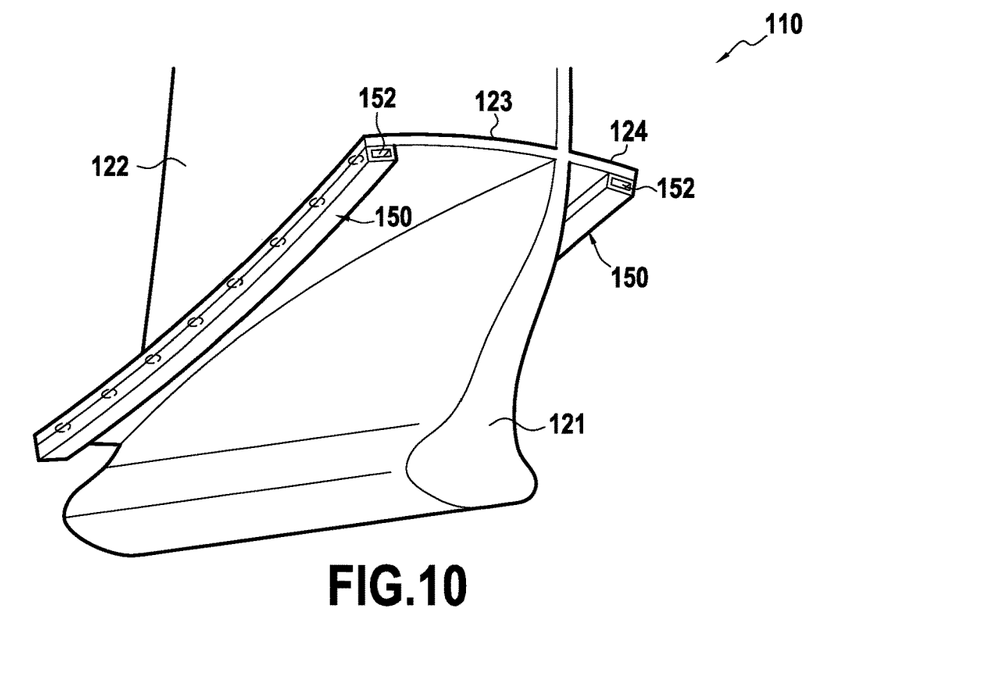

FIGS. 9 and 10 show a second embodiment of a blade 110. In this second embodiment, the stiffener is in the form of a respective box shape 150 of rectangular or trapezoidal section extending against the bottom surfaces of the platforms 123, 124 all along their distal ends. The box shape is hollow over its entire length, thereby forming cavities 151 and 152 that are open axially respectively at the upstream and downstream ends.

Such a blade 110 may be obtained using a fabrication method analogous to that of the first embodiment. An analogous main fiber preform is thus woven and then the box shapes 150 are fitted against the bottom surfaces of the transverse segments of the main preform, e.g. using rivets 159, or spots of adhesive, with the preform as finished off in this way then being subjected to co-injection.

Alternatively, the box shapes 150 may be fitted by adhesive bonding, riveting, bolting, or any other method on a composite blade that has already been consolidated, e.g. coming from the above-described main fiber preform 30.

Furthermore, it should be observed that it is possible to provide the box shapes 150 with anti-overlapping devices analogous to the device shown in FIG. 6, with the suction side box shapes having respective grooves and the pressure side box shapes corresponding splines.

Figure 11:
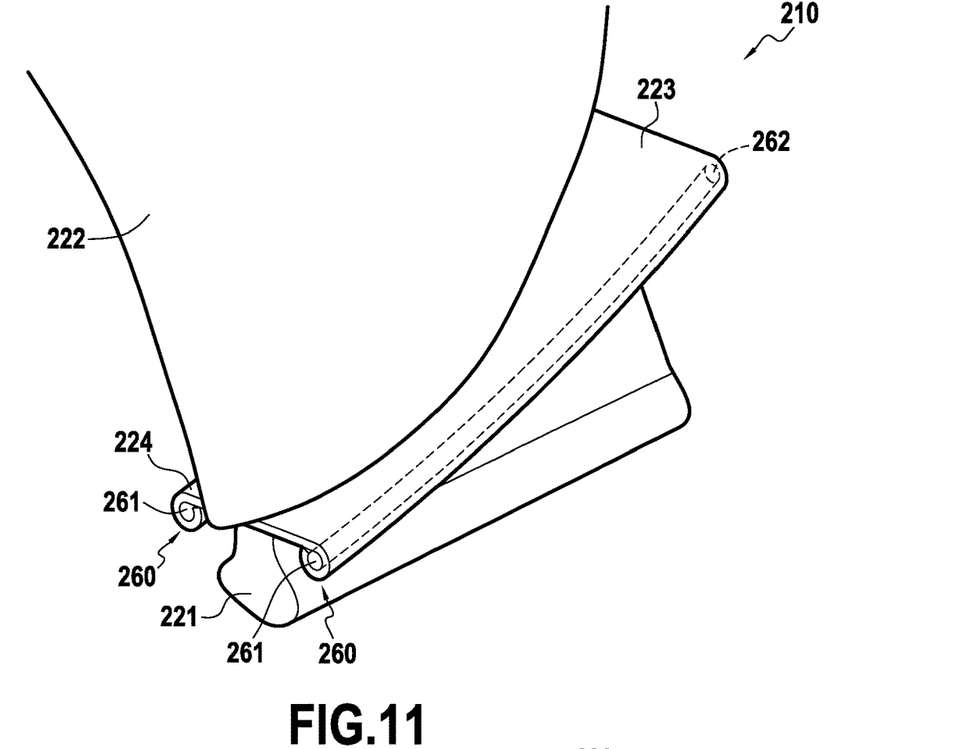
FIG. 11 is a fragmentary perspective view of a blade in a third embodiment.

FIG. 11 shows a third embodiment of a blade 210. In this third embodiment, the stiffener is in the form of a cylinder 260 of circular or oval section extending all along the distal end of each platform 223, 224, and enclosed in the thickness thereof.

Figure 12:
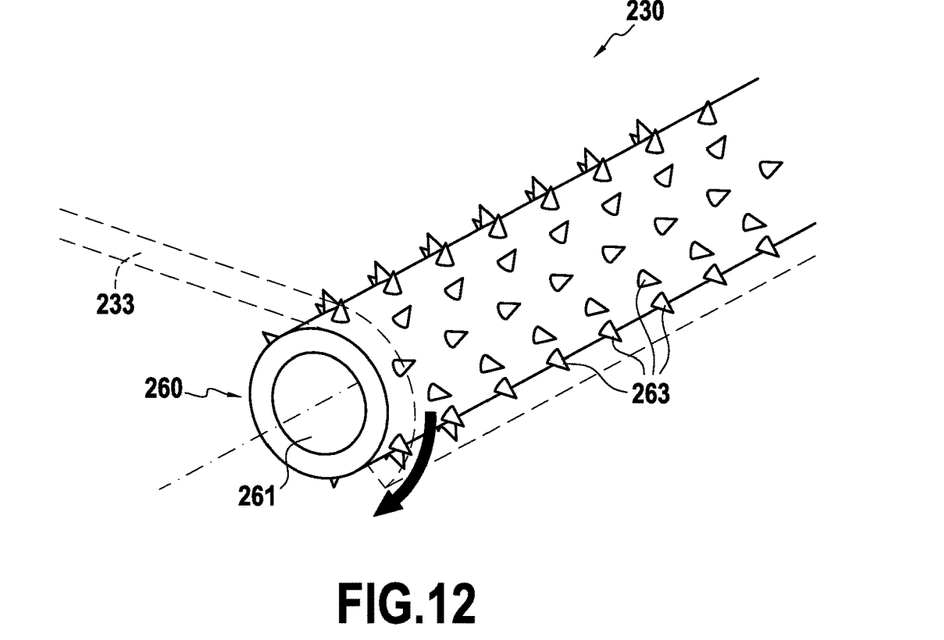
FIG. 12 is a diagram showing a step in fabricating the preform for the FIG. 11 blade.

As can be seen in FIG. 12, the cylinder 260 is hollow along its entire length, thereby forming cavities 261 and 262 that are axially open respectively at the upstream and downstream ends. The cylinder also possesses spikes 263 distributed over its outside surface.

Fabricating such a blade 210 is analogous to the first and second embodiments described above. A main fiber preform 230 is initially woven in a manner analogous to the above embodiments, while nevertheless giving the transverse segments 233 greater length.

Once weaving of the main preform 230 has finished, the transverse segments 233 are folded out transversely and then the distal end of each transverse segment 233 is wound around one cylinder 260: the spikes 263 of the cylinder then project between the fibers of the transverse segment 233.

The preform as finished off in this way is then consolidated by injecting a matrix in a manner analogous to the preceding embodiments.

Figure 13:
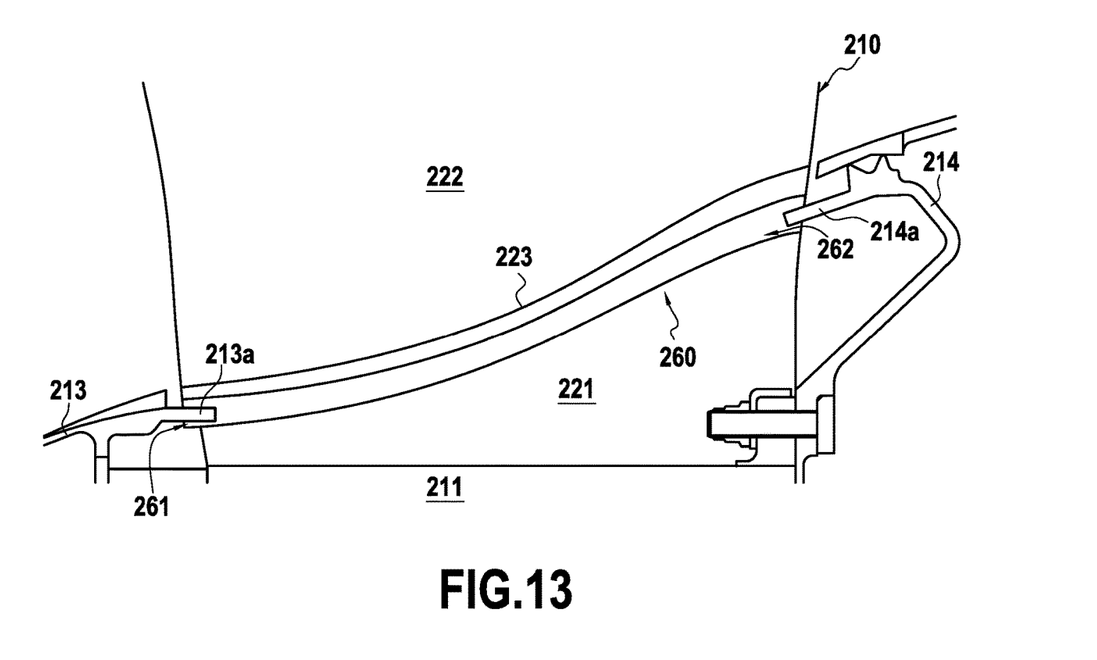
FIG. 13 is an axial section view of a bladed wheel in a third embodiment.

FIG. 13 is a diagrammatic axial section view of the blade 210 mounted on the fan disk 211. In FIG. 13, the upstream shell 213 and the downstream drum 214 of the fan 2 can be seen: these two members 213 and 214 are situated on the rotor and thus rotate synchronously with the disk 211 and the blades 210.

It should be observed in FIG. 13 that the upstream shell 213 has a plurality of fingers 213a that engage in the upstream cavities 261 of the cylinders 260, and the downstream drum 214 is likewise fitted with a plurality of fingers 214a that engage in the downstream cavities 262 of the cylinders 260, such devices serving to hold the cylinders 260 and thus avoid excessive deformation of the platforms 223 in operation.

It can also be understood that such a retaining mechanism is also possible with the stiffeners in the form of box shapes 150 in the second embodiment.

The embodiments or implementations described in the present description are given as non-limiting illustrations, and a person skilled in the art can easily, in the light of the description, modify these embodiments or implementations, or can envisage others, while remaining within the scope of the invention.

Furthermore, the various characteristics of these embodiments or implementations can be used singly or combined with one another. When they are combined, the characteristics may be combined as described above or in other ways, the invention not being limited to the specific combinations described in the present description. In particular, unless specified to the contrary, a characteristic described with reference to any one embodiment or implementation may be applied in analogous manner to another embodiment or implementation.

The invention claimed is:

1. A preform for a turbine engine blade, the preform comprising a main fiber preform obtained by three-dimensional weaving and comprising:
   a first longitudinal segment suitable for forming a blade root;
   a second longitudinal segment extending the first longitudinal segment upwards, and suitable for forming an airfoil portion; and
   a first transverse segment extending transversely from the junction between the first and second longitudinal segments, and suitable for forming a first platform;
   wherein the preform also includes at least a stiffener fitted on the main fiber preform along at least a portion of the distal edge of the first transverse segment; and
   wherein the stiffener extends along the distal edge of the first transverse segment at least from its upstream or downstream end.

2. A preform according to claim 1, wherein the stiffener is a shim possessing a U-shaped section and gripping the distal edge of the first transverse segment.

3. A preform according to claim 2, wherein the top end of the shim engages in a setback formed in the top surface of the first transverse segment so that the top surface of the shim is flush with the top surface of the first transverse segment.

4. A preform according to claim 1, wherein the stiffener is a box shape fitted against the bottom surface of the first transverse segment.

5. A preform according to claim 1, wherein the stiffener possesses an axial spline or an axial notch configured to co-operate respectively with the axial notch or the axial spline of a stiffener of a platform of a neighboring blade.

6. A preform according to claim 1, wherein the stiffener is a cylinder, provided with spikes, with the distal end of the first transverse segment being wound around the cylinder.

7. A preform according to claim 4, wherein the stiffener possesses an axial internal cavity.

8. A preform according to claim 1, wherein the main fiber preform has a second transverse segment extending transversely from the junction between the first and second longitudinal segments level with and going away from the first transverse segment, and suitable for forming a second platform; and
   wherein the preform also has a second stiffener fitted on the main fiber preform along at least a portion of the distal edge of the second transverse segment.

9. A blade for a turbine engine, comprising:
   a blade root;
   an airfoil portion extending upwards from the blade root; and
   a platform, made of composite material and extending transversely to the airfoil portion level with the junction between the blade root and the airfoil portion;
   wherein the platform has a stiffener extending along at least a portion of the distal edge of said platform; and
   wherein the stiffener extends along the distal edge of the platform at least from its upstream or downstream end.

10. A blade according to claim 9, made in single-piece manner out of composite material by means of a preform, said preform being shaped in a mold and embedded in a matrix.

11. A blade according to claim 9, wherein the stiffener is fitted to the platform.

12. A bladed wheel for a turbine engine, having a plurality of blades according to claim 9.

13. A turbine engine, including at least a blade according to claim 9.

14. A preform for a turbine engine blade, the preform comprising a main fiber preform obtained by three-dimensional weaving and comprising:
   a first longitudinal segment suitable for forming a blade root;
   a second longitudinal segment extending the first longitudinal segment upwards, and suitable for forming an airfoil portion; and
   a first transverse segment extending transversely from the junction between the first and second longitudinal segments, and suitable for forming a first platform,
   wherein the preform also includes at least a stiffener fitted on the main fiber preform along at least a portion of the distal edge of the first transverse segment, and
   wherein the stiffener is a cylinder, with the distal end of the first transverse segment being wound around the cylinder.

15. A blade for a turbine engine, comprising:
   a blade root;
   an airfoil portion extending upwards from the blade root; and
   a platform, made of composite material and extending transversely to the airfoil portion level with the junction between the blade root and the airfoil portion,
   wherein the platform has a stiffener extending along at least a portion of the distal edge of said platform, and
   wherein the stiffener is a cylinder, with the distal end of the platform being wound around the cylinder.

* * * * *